United States Patent
Hayakawa

(10) Patent No.: US 9,378,213 B2
(45) Date of Patent: Jun. 28, 2016

(54) INFORMATION PROCESSING APPARATUS, INFORMATION PROCESSING METHOD, AND STORAGE MEDIUM

(75) Inventor: Takeshi Hayakawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 153 days.

(21) Appl. No.: 13/427,396

(22) Filed: Mar. 22, 2012

(65) Prior Publication Data

US 2012/0271869 A1  Oct. 25, 2012

(30) Foreign Application Priority Data

Apr. 20, 2011 (JP) ................................. 2011-093992

(51) Int. Cl.
*G06F 17/30* (2006.01)
*G06F 3/0486* (2013.01)

(52) U.S. Cl.
CPC ........ *G06F 17/30126* (2013.01); *G06F 3/0486* (2013.01)

(58) Field of Classification Search
CPC .................................................... G06F 3/0486
See application file for complete search history.

(56) References Cited

U.S. PATENT DOCUMENTS

| | | | |
|---|---|---|---|
| 6,034,832 A * | 3/2000 | Ichimura et al. | 360/60 |
| 6,687,741 B1 * | 2/2004 | Ramaley | G06Q 10/107 709/206 |
| 2004/0257921 A1 * | 12/2004 | Nishimura et al. | 369/30.08 |
| 2007/0016630 A1 * | 1/2007 | Samji et al. | 707/204 |
| 2007/0038610 A1 * | 2/2007 | Omoigui | 707/3 |
| 2007/0172155 A1 * | 7/2007 | Guckenberger | 382/305 |
| 2007/0253035 A1 * | 11/2007 | Takesada | 358/468 |
| 2008/0184148 A1 * | 7/2008 | Selig | 715/769 |
| 2008/0307367 A1 * | 12/2008 | Garrison et al. | 715/853 |
| 2009/0172201 A1 * | 7/2009 | Carmel | 709/248 |
| 2009/0287634 A1 * | 11/2009 | Chang et al. | 707/1 |
| 2012/0047568 A1 * | 2/2012 | Keng | 726/9 |

FOREIGN PATENT DOCUMENTS

| | | |
|---|---|---|
| JP | 2004-220319 A | 8/2004 |
| JP | 2005-267614 A | 9/2005 |
| JP | 2008-90809 A | 4/2008 |

OTHER PUBLICATIONS

Rosevines, "Quickly copy a folder's contents," Apr. 6, 2010, geekgirl's plain english computing, http://geekgirls.com/2010/04/quickly-copy-a-folders-contents/ [accessed Oct. 5, 2015].*

* cited by examiner

*Primary Examiner* — Richard Bowen
(74) *Attorney, Agent, or Firm* — Canon USA, Inc. IP Division

(57) ABSTRACT

An information processing apparatus includes an inquiry unit configured to inquire, if a drag and drop operation or a copy and paste operation of a file path is performed from a file management unit "A" to a file management unit "B", what data is dropped of an operating system, a file object acquisition unit configured to acquire, if data is a character string indicating a file path, a file object of the file path, an intra-folder file object acquisition unit configured to acquire, if the data is a character string indicating a folder, a file object in the folder, and an addition unit configured to add the file object acquired by the file object acquisition unit or the file object acquired by the intra-folder file object acquisition unit to a file of a management target of the file management unit "B".

9 Claims, 11 Drawing Sheets

FIG. 9

```
901
        FILE ADDITION CONDITION TABLE
  ┌─────────────────────────────────────────────┐
  │ ┌─────────────────────────────────────────┐ │
  │ │ FILE ADDITION CONDITION: 200 MEGABYTES OR│ │
  │ │                          SMALLER IN SIZE │ │
  │ └─────────────────────────────────────────┘ │
  │   902                                       │
  └─────────────────────────────────────────────┘
```

INFORMATION PROCESSING APPARATUS, INFORMATION PROCESSING METHOD, AND STORAGE MEDIUM

BACKGROUND OF THE INVENTION

1. Field of the Invention

The present invention relates to an information processing apparatus, an information processing method, and a storage medium.

2. Description of the Related Art

As a method for easily moving or copying a file from one application to another, functions such as a drag and drop function using a mouse and a copy and paste function using a keyboard are enabled by operating systems and applications. If link information which can be used in downloading a file is included in a Hyper Text Markup Language (HTML) file displayed on the web browser, a shortcut of the html file can be generated if a user performs a drag and drop operation of the link in the html file to a local personal computer (PC). In this case, the user cannot obtain the target file itself. Thus, Japanese Patent Application Laid-Open No. 2008-90809 discusses a technique that enables a search of a file linked to the html and copy the corresponding file when a drag and drop operation is performed using a web browser.

However, according to the technique discussed in Japanese Patent Application Laid-Open No. 2008-90809, the corresponding file can be copied only when the html object dropped in the local PC has a link path. Thus, for example, if a character string of a file path of an object other than an html object or data other than a file object is dropped in the local PC, the application that received the drop processing is unable to determine the character string or the data as a file. As a result, the user cannot acquire the file. This is because, although a file link can be searched according to tracking of the tag information of the html, the application that received the drop processing cannot determine whether the data can be used in the application if the received data is an unspecified character string or data other than a file object.

SUMMARY OF THE INVENTION

The present invention is directed to a technique enables easy addition or transfer of a file to a file management application.

According to an aspect of the present invention, an information processing apparatus includes an inquiry unit configured to inquire, if a drag and drop operation or a copy and paste operation of a file path is performed from a first file management unit to a second file management unit, what data is dropped of an operating system, a file object acquisition unit configured to acquire, if data which undergoes the drag and drop operation or the copy and paste operation is a character string indicating a file path as a result of the inquiry made by the inquiry unit, a file object of the file path, an intra-folder file object acquisition unit configured to acquire, if the data is a character string indicating a folder as a result of the inquiry made by the inquiry unit, a file object in the folder, and an addition unit configured to add the file object acquired by the file object acquisition unit or the file object acquired by the intra-folder file object acquisition unit to a file of a management target of the second file management unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 illustrates an example of a data structure of a file addition condition table.

DESCRIPTION OF THE EMBODIMENTS

Various exemplary embodiments, features, and aspects of the invention will be described in detail below with reference to the drawings.

An information processing apparatus according to a first exemplary embodiment includes a file management application having a function of filing document data generated by a general application in a unique manner different from the filing of an operating system.

Figure 1:
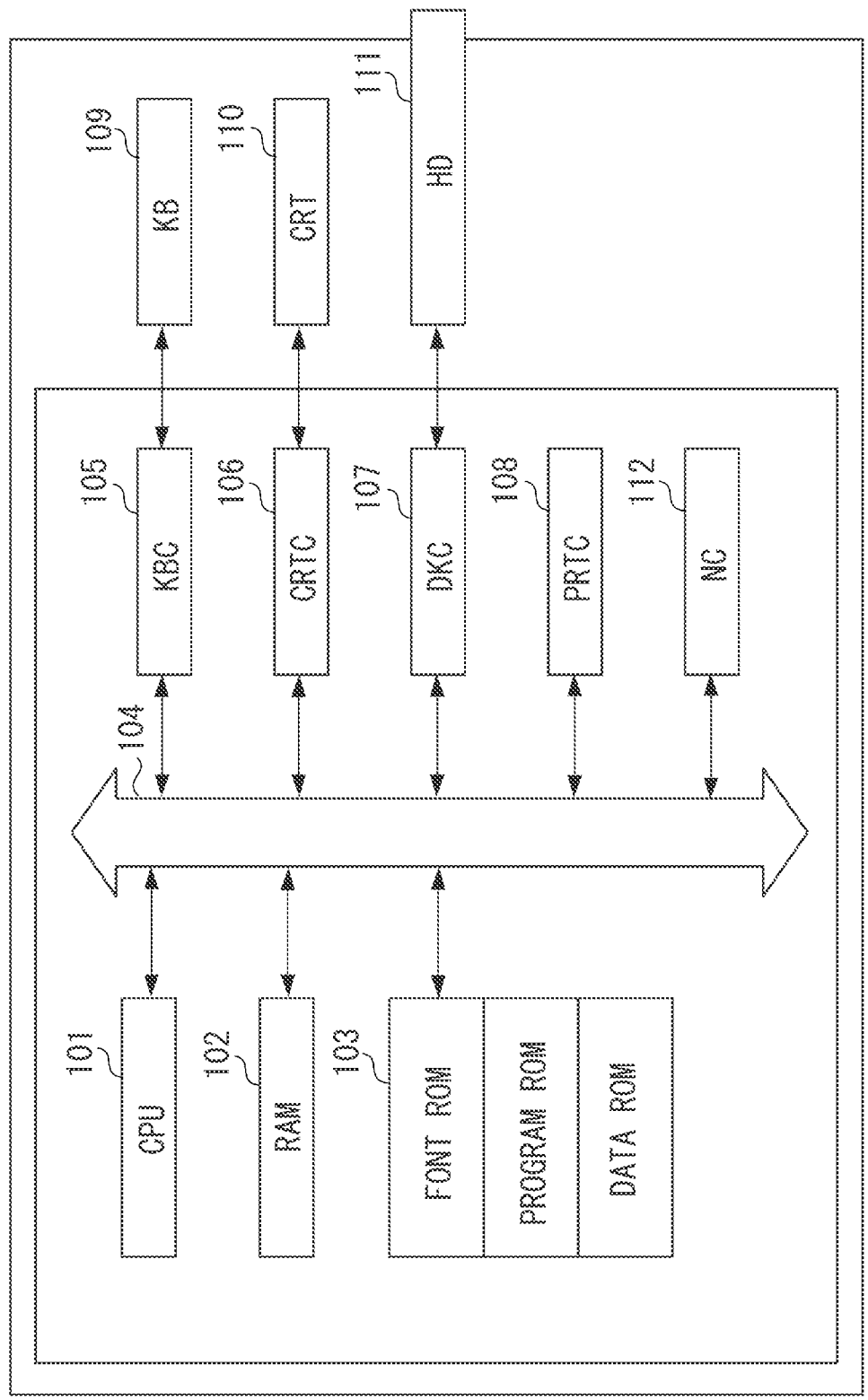
FIG. 1 illustrates an example of a hardware configuration of an information processing apparatus.

FIG. 1 illustrates an example of a hardware configuration of the information processing apparatus.

In FIG. 1, a central processing unit (CPU) 101 executes a program such as an operating system (OS) or a general application stored in a read-only memory (ROM) 103 or a hard disk (HD) 111 and loaded into a random access memory (RAM) 102, and realizes a software function and processing of flowcharts described below.

The RAM 102 functions as a main memory and a work area of the CPU 101. A keyboard controller (KBC) 105 controls a key input by a user from a keyboard 109 or a pointing device (not illustrated). A cathode ray tube controller (CRTC) 106 controls display of a CRT display 110. A disk controller (DKC) 107 controls access to the hard disk 111 and a flexible disk (FD) where a boot program, various applications, font data, and user files are stored. A printer controller (PRTC) 108 controls exchange of signals with a printer. A network controller (NC) 112 is connected to a network and executes communication control processing with another apparatus connected to the network.

In the following descriptions, in order to simplify the description, the processing is described as performed by a file management application or the operating system in place of the CPU 101.

Figure 2:
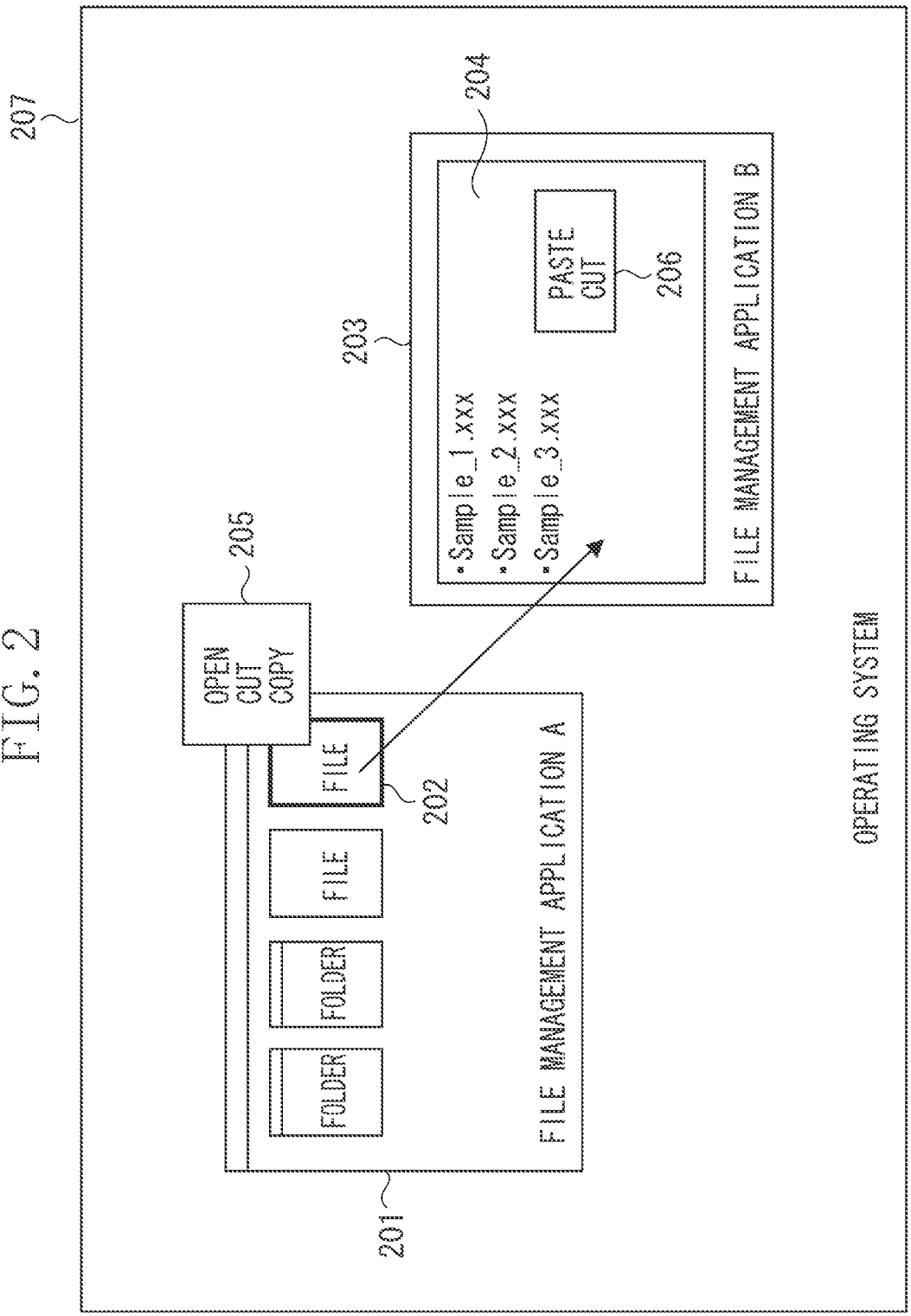
FIG. 2 illustrates an example of a file management application.

FIG. 2 illustrates an example of the file management application.

In FIG. 2, two applications, namely a file management application A201 and a file management application B203, run on an operating system 207. The operating system 207, the file management application A201, and the file management application B203 are software that operates in the information processing apparatus illustrated in FIG. 1.

The file management application A201 includes a number of folders and files. Document data 202 is generated by a general application. The user can copy or move the document data 202 using a mouse or a keyboard from the file management application A201.

A file management view 204 is a view of the file management application B203. The user can see the files managed by the file management application B203 via the file management view 204, and thus can copy or move the files using the mouse or the keyboard.

If the user desires to move a file from the file management application A201 to the file management application B203, the user drags the document data 202 with the mouse, moves the mouse cursor to the file management view 204, and drop it thereon. In this manner, the user can move the file from the file management application A201 to the file management application B203. This is a commonly used drag and drop operation of a personal computer. This function is realized by the operating system 207 and an application.

The file management application A201 is an example of a file management unit A (first file management unit). The file management application B203 is an example of a file management unit B (second file management unit).

A menu 205 is displayed when the user clicks a right button of the mouse on the file management application A201 of the operating system 207. Items such as "open", "cut", and "copy" can be indicated in the menu 205 of the operating system 207. The operating system 207 performs the operation corresponding to the item which is selected by the user from the menu 205.

A menu 206 is displayed when the user clicks the right mouse button on the file management view 204. Items such as "paste" and "cut" can be indicated in the menu 206. The file management application B203 performs the operation corresponding to the item which is selected by the user from the menu 206.

If the user selects "copy" from the menu 205 of the operating system 207 and further selects "paste" from the menu 206 of the file management application, then, a file is copied from the file management application A201 of the operating system 207 to the file management application B203. Since a shortcut key is assigned to the menu 205 of the operating system 207 and the menu 206 of the file management application, a similar operation can be performed by using the keyboard. This is a commonly used copy and paste operation of a personal computer.

Figure 3:
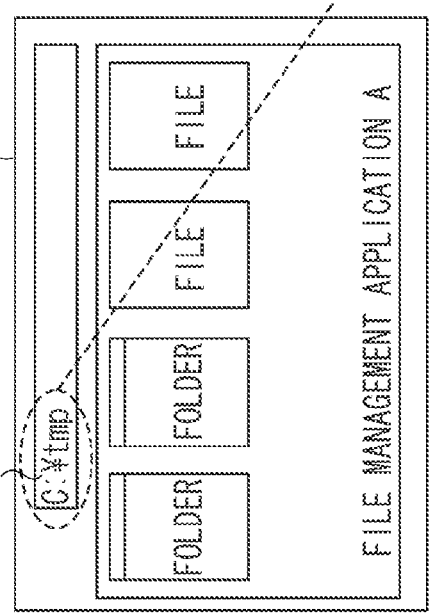
FIG. 3 illustrates a file transfer operation to the file management application.

FIG. 3 illustrates a file transfer operation to a file management application.

The file management applications illustrated in FIG. 3 run on the operating system 207 similar to those illustrated in FIG. 2. A file management application B303 and a file management view 304 are similar to the file management application B203 and the file management view 204 in FIG. 2. A difference between that a file management application A301 and the file management application A201 of the operating system 207 in FIG. 2 is that the file management application A301 includes an address bar 302 which is a field for displaying a file path.

A file path to the folder which is currently displayed or a file path that specifies the selected file is displayed in the address bar 302. The user can drag the address bar 302 by the mouse and drop it in the file management view 304. According to the conventional technique, this drag and drop operation cannot add a file to the file management view 304.

This is because although the file management application B303 receives the drop instruction from the operating system 207, since the object is not a file object, the file management application B303 considers the object to be excluded from a target for adding the file to the application, and does not add the file indicated by the file path. A similar thing occurs when a file path character string in the address bar 302 is subjected to the copy and paste operation.

A mail application 305 includes a hyperlink 306 which is a link to a particular file. The drag and drop operation of the hyperlink 306 to the file management view 304 is performed by the mouse. However, a file cannot be added to the file management view 304 according to this drag and drop operation. Although the file management application B303 receives the drop instruction from the mail application 305 via the operating system 207, since the object is not a file object, the file management application B303 excludes the object from the target for adding the file to the application. A similar thing occurs when a file path character string of the hyperlink 306 is subjected to the copy and paste operation.

Figure 4:
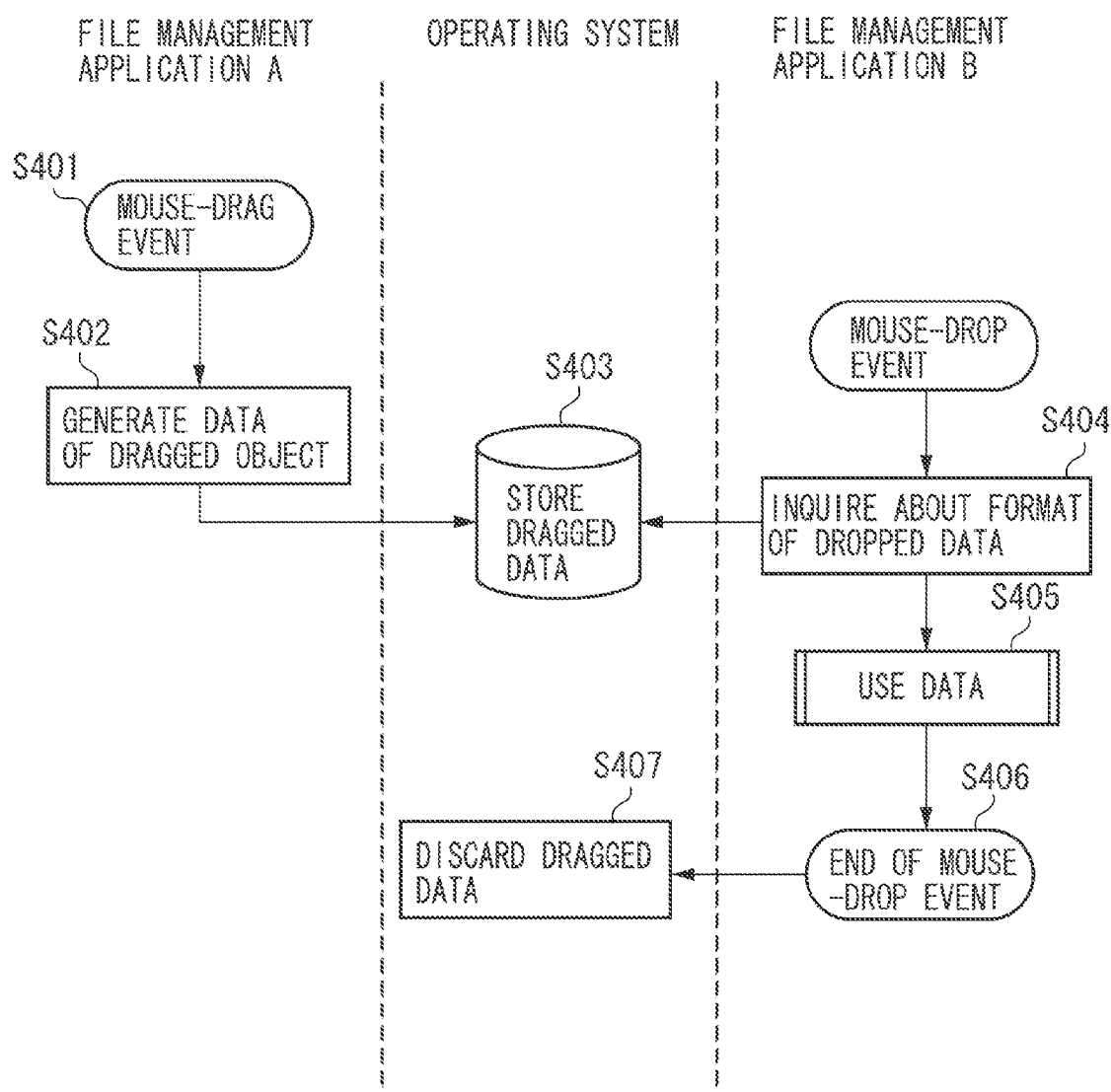
FIG. 4 is a flowchart illustrating processing of the file management application and an operating system.

FIG. 4 is a flowchart of the processing of the file management application and the operating system.

In step S401, the file management application A201 receives a mouse-drag event. In step S402, the file management application A201 generates data of the object which is dragged. The content of the data to be generated is determined by the file management application A201. Generally, if a document file is dragged, data of the document file is generated. If a character string is dragged, data of the character string is generated.

In step S403, the operating system 207 stores the dragged data in response to the instruction to generate dragged data in step S402 from the file management application A201. The processing in steps S402 and S403 is generally performed via a framework provided by the operating system 207. According to the present exemplary embodiment, the processing in steps S402 and S403 is regardless of the type of framework used by the operating system 207, and is regarded as the processing performed by the operating system 207 including the framework.

The file management application B203 receives a mouse-drop event.

In step S404, the file management application B203 makes an inquiry to the operating system 207 about the format of the dropped data. The data dropped in the file management application B203 is the same as the data dragged from the file management application A201. In other words, the data dropped in the file management application B203 is the dragged data stored in the operating system 207 in step S403.

In step S405, based on a result of the inquiry regarding the format of the dropped data, the file management application B203 uses the dragged data. The use of the dragged data in step S405 is described with reference to the flowchart in FIG. 5. In step S406, the mouse-drop event ends. Since the mouse-drop event ends in step S406, in step S407, the operating system 207 discards the dragged data stored in step S403.

Next, a flowchart illustrating the drag and drop operation to the file management application is described.

Figure 5:
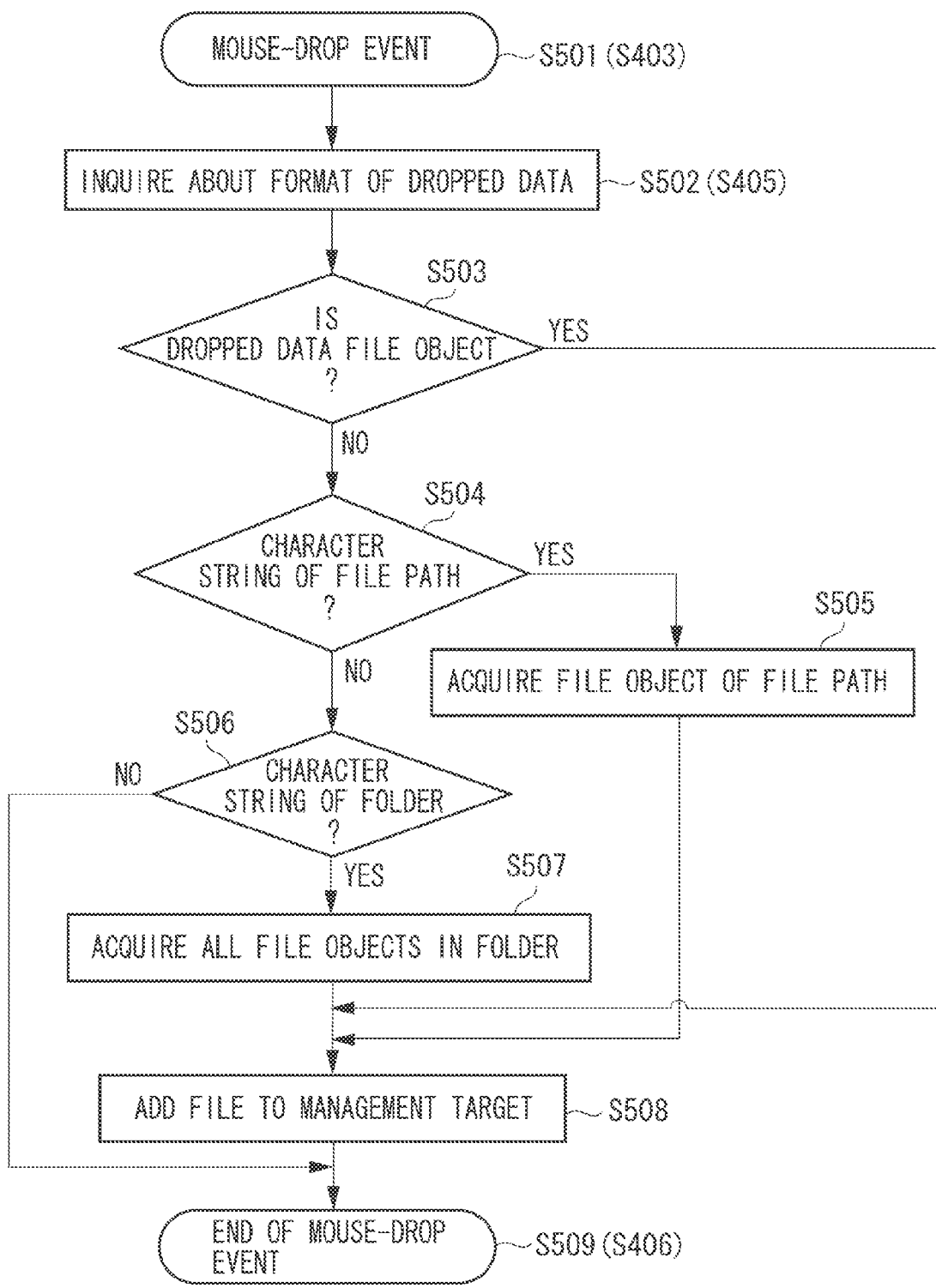
FIG. 5 is a flowchart illustrating processing of the file management application and the operating system.

FIG. 5 is a flowchart illustrating processing of the file management application and the operating system. The processing in FIG. 5 is a subroutine of processing in step S405 in FIG. 4. The flowchart in FIG. 5 illustrates processing performed by the file management application B303.

In step S501, the file management application B303 receives the mouse-drop event from the operating system 207.

In step S502, the file management application B303 makes an inquiry to the operating system 207 about the format of the dropped data and obtains information about the format of the dropped data. This processing corresponds to step S404 in FIG. 4. The information about the format obtained from the operating system 207 is described with reference to FIG. 6. The format of the dropped data is determined by the application that drags the object. According to the present exemplary embodiment, the file management application A301 is the application that drags the object. A plurality of formats can be used for the data.

In step S503, the file management application B303 determines whether the data which is dropped is a file object. If the dropped data is a file object (YES in step S503), the processing proceeds to step S508. In step S508, the file management application B303 adds the dropped data, namely the file, to the files managed by the file management application B303. The added file is displayed on the file management view 304. This is the conventional processing flow of the drag and drop operation.

If the file management application B303 determines that the dropped data is not a file object (NO in step S503), the processing proceeds to step S504. In step S504, the file management application B303 determines whether the dropped data is a character string of a file path. If the dropped data is a character string of a file path (YES in step S504), the processing proceeds to step S505. In step S505, the file management application B303 retrieves the document data and copies the file based on the file path. This copy processing is processing performed by the file management application B303 acquiring the file object into the memory. The processing in step S505 is an example of file object acquisition processing.

In step S508, the file management application B303 generates the file object as a file in the region managed by the file management application B303. Then, the file management application B303 adds the file to the files managed by the file management application B303, and then the processing ends.

In step S504, if the dropped data is not a character string of a file path (NO in step S504), the processing proceeds to step S506. In step S506, the file management application B303 determines whether the dropped data is a character string of a folder. If the file management application B303 determines that the dropped data is not a character string of a folder (NO in step S506), the processing proceeds to step S509. Since the data is neither a file nor a folder, there is no file to be added to the file management application B303. This means that an object other than a file is dragged and dropped. Such an object is, for example, a program in an executable format or a Uniform Resource Locator (URL) character string. In step S509, the mouse-drop event ends. This processing corresponds to that in step S406 in FIG. 4.

In step S506, if the file management application B303 determines that the dropped data is a character string of a folder (YES in step S506), the processing proceeds to step S507. In step S507, the file management application B303 acquires file objects of all the files in the corresponding folder. The processing in step S507 is an example of intra-folder file object acquisition processing.

In step S508, the file management application B303 generates a file object as a file in the region managed by the file management application B303. Then, the file management application B303 adds the file to the files managed by the file management application B303, and the processing ends.

Figure 6:
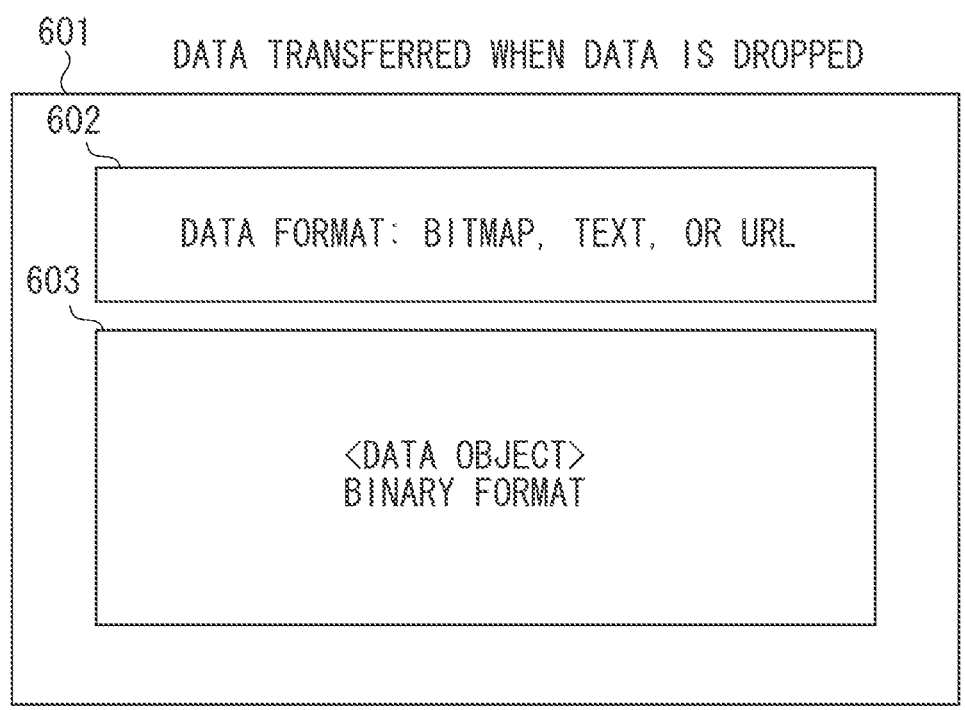
FIG. 6 illustrates an example of a data structure which is generated when a drag and drop operation is performed.

FIG. 6 illustrates an example of the data structure which is generated when the drag and drop operation is performed. A data structure 601 uses the storage area of the ROM 103 or the hard disk 111 of the information processing apparatus illustrated in FIG. 1 and is stored in the operating system 207 when an instruction issued from the file management application A301 is received. The file management application B303 can receive the data structure 601 from the operating system 207 as the dropped data.

The data structure 601 includes a data format 602 and a data object 603 that stores the data object. Regarding the processing for inquiring the format of the dropped data in step S502 in FIG. 5, the operating system 207 reads the data format 602 and notifies the file management application B303 of the read data format.

If bitmap data is dropped, the data format indicates "bitmap". If a text character string is dropped, the data format indicates "text". The types of the data format are defined in the framework handled by the operating system 207. The data format can be handled by the file management application A301 as well as the file management application B303.

Binary data of the dropped data is stored in the data object 603. The file management application B303 can retrieve the data object 603 as data in the original data format. If the data format is "text", a specific character string is stored in the data object 603. If the data format is a file path, a character string such as "C:¥test¥aaaa.xxx" is stored in the data object 603.

According to the present exemplary embodiment, even if the data which has undergone the drag and drop operation is a text character string, if the data referred by the character string is a file, the file can be added to the file management application. According to the processing flow in FIG. 4, although the drag and drop operation is described, a paste operation of a copied object is similar to the drop operation on the program. Thus, a similar effect can be also obtained for the copy and paste operation.

According to the first exemplary embodiment, when a drag and drop operation or a copy and paste operation of a file to a file management application is performed, the file can be added even if the object dragged or copied is not a file object but a file link. However, since a file is added without user's confirmation of the actual file, file (s) that the user does not desire, such as a large number of files and a large-size file which exist in the link destination, may be unintentionally added to the file management application. According to a second exemplary embodiment, the size of the file is determined before it is added.

According to the second exemplary embodiment, since the configurations and the processing are similar to those described with reference to FIGS. 1 to 4 and 6 described with respect to the first exemplary embodiment, their descriptions are not repeated. The processing of the second exemplary embodiment is similar to the processing of the file management application and the operating system in the first exemplary embodiment except that new processing is added to the processing flow.

Figure 7:
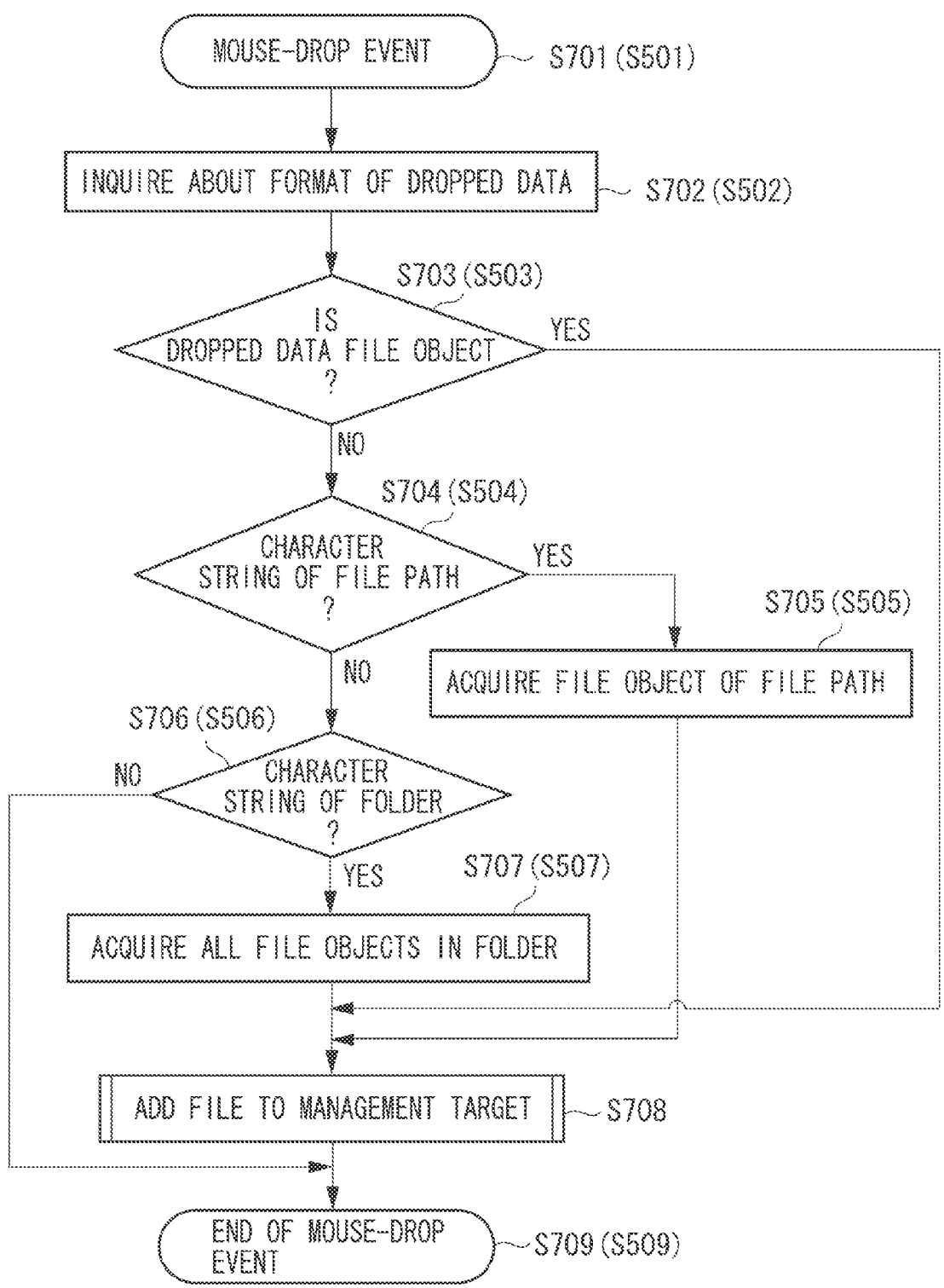
FIG. 7 is a flowchart illustrating processing of the file management application and the operating system.

FIG. 7 is a flowchart illustrating processing of the file management application and the operating system according to the present exemplary embodiment.

Regarding the processing flow in FIG. 7, descriptions of the processing in steps similar to steps S501 to S507 and S509 in FIG. 5 according to the first exemplary embodiment (which are indicated by the step number in parentheses) are not repeated.

In step S708, the file management application B303 generates the file object as a file in the region managed by the file management application B303. Then, the file management application B303 adds the file to the files managed by the file management application B303. According to the second exemplary embodiment, a subroutine that changes the processing according to the file size is added to the processing flow. The subroutine is described with reference to FIG. 8.

Figure 8:
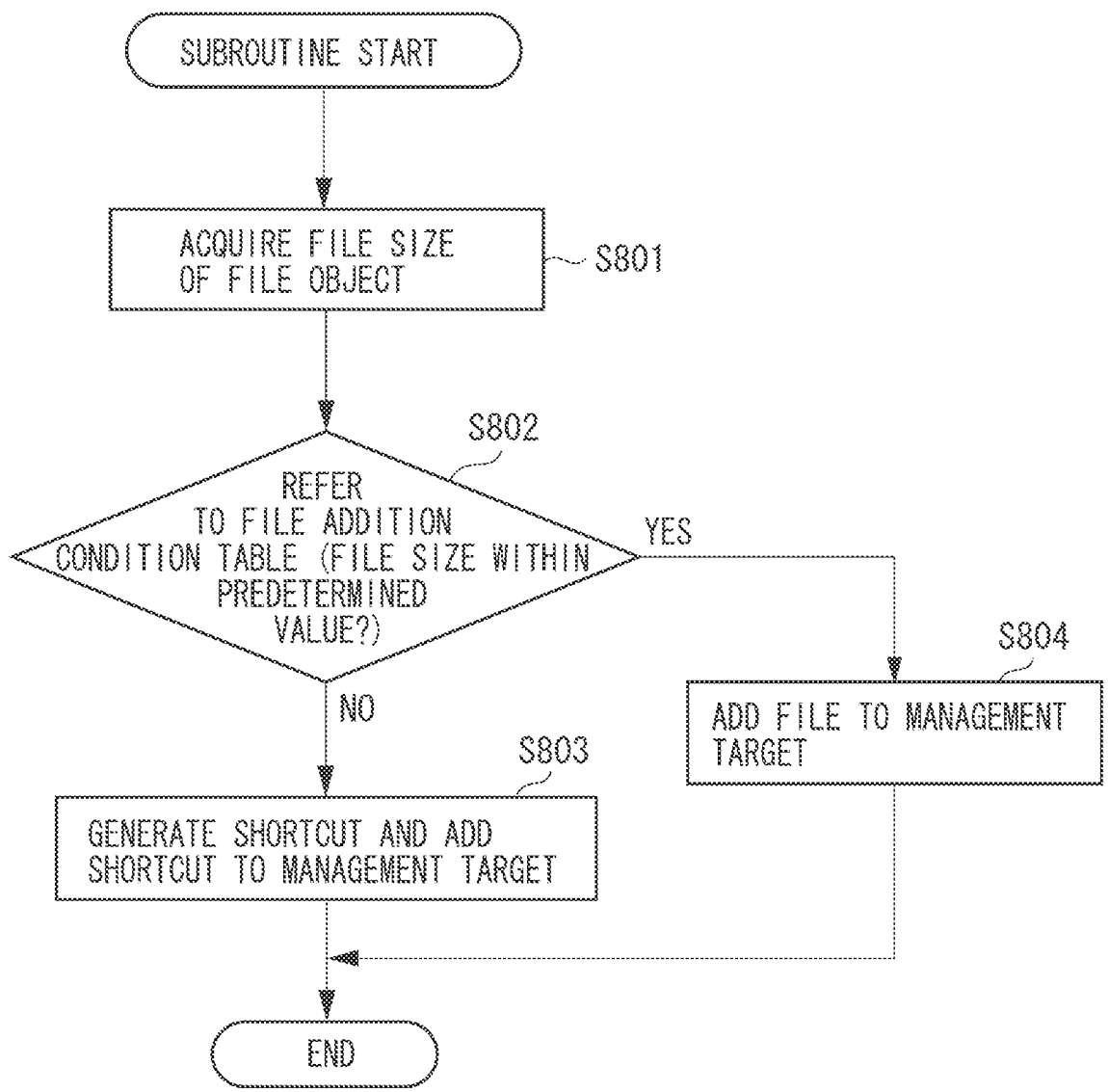
FIG. 8 is a flowchart illustrating addition processing of a file object.

FIG. 8 is a flowchart illustrating the addition of a file object.

In step S801, the file management application B303 acquires a file size from the file object acquired in step S705 or S707. If there is a plurality of file objects, the file management application B303 calculates both a size of each file object and a total size of the file objects.

In step S802, the file management application B303 refers to a file addition condition table. A file addition condition is set in the file addition condition table. According to the present exemplary embodiment, a file size condition is set in the table. Details of the file addition condition table is described with reference to FIG. 9.

In step S802, the file management application B303 determines whether the size of each file and the total size of the files acquired in step S801 satisfy the file addition condition. The condition is, for example, whether the total size is 200 megabytes or smaller. The file management application B303 determines the condition in this manner, and if the condition is satisfied (YES in step S802), the processing proceeds to step S804. If the condition is not satisfied (NO in step S802), the processing proceeds to step S803.

In step S803, the file management application B303 generates a shortcut to the original file of the file object. Then, the file management application B303 sets the generated shortcut as the object to be managed in place of a file. On the other hand, if the condition is satisfied in step S802, then in step S804, the file management application B303 adds the file to the files managed by the file management application B303. This operation is similar to the operation performed in step S509 in FIG. 5.

FIG. 9 illustrates an example of a data structure of the file addition condition table.

A file addition condition table 901 is a data table stored by the file management application B303 and is stored in the hard disk 111 when the file management application B303 is installed. The file management application B303 can freely refer to the file addition condition table 901 when the file management application B303 is being executed.

The file addition condition table 901 includes a file addition condition 902. The file addition condition 902 is a conditional expression of the processing in step S802. In FIG. 9, "200 megabytes or smaller" is set as the condition. The condition "200 megabytes or smaller" is an example of a setting value and the numerical value is changeable.

As described above, according to the present exemplary embodiment, in addition to the effect obtained from the first exemplary embodiment, if a file size is larger than a predetermined size, the file is not copied and a shortcut is generated and managed in place of the file. In this way, the file management application B303 prevents the user's unintentional addition of a large-size file to the file management application.

According to the first and the second exemplary embodiments, when the drag and drop operation or the copy and paste operation of a file to a file management application is performed, a file is added even if the object is not a file object but a character string of a file path. Regarding the file management application, there is a use of taking out a file which is added to the file management application from the file management application and updating the file at the original location. In such a case, it is difficult for the user to always grasp the original location of the file which has been added according to the drag and drop operation or the copy and paste operation. Thus, the user generally searches the original location using a method other than the file management application.

According to a third exemplary embodiment, since the configurations and the processing are similar to those described with reference to FIGS. 1 to 5 and 7 to 9 described with respect to the first and the second exemplary embodiments, their descriptions are not repeated. The processing of the third exemplary embodiment is similar to the processing of the file management application and the operating system in FIG. 5 of the first exemplary embodiment and FIG. 7 of the second exemplary embodiment except that new processing is added to the processing flow. The third exemplary embodiment can be used in combination with either the first or the second exemplary embodiment.

Figure 10:
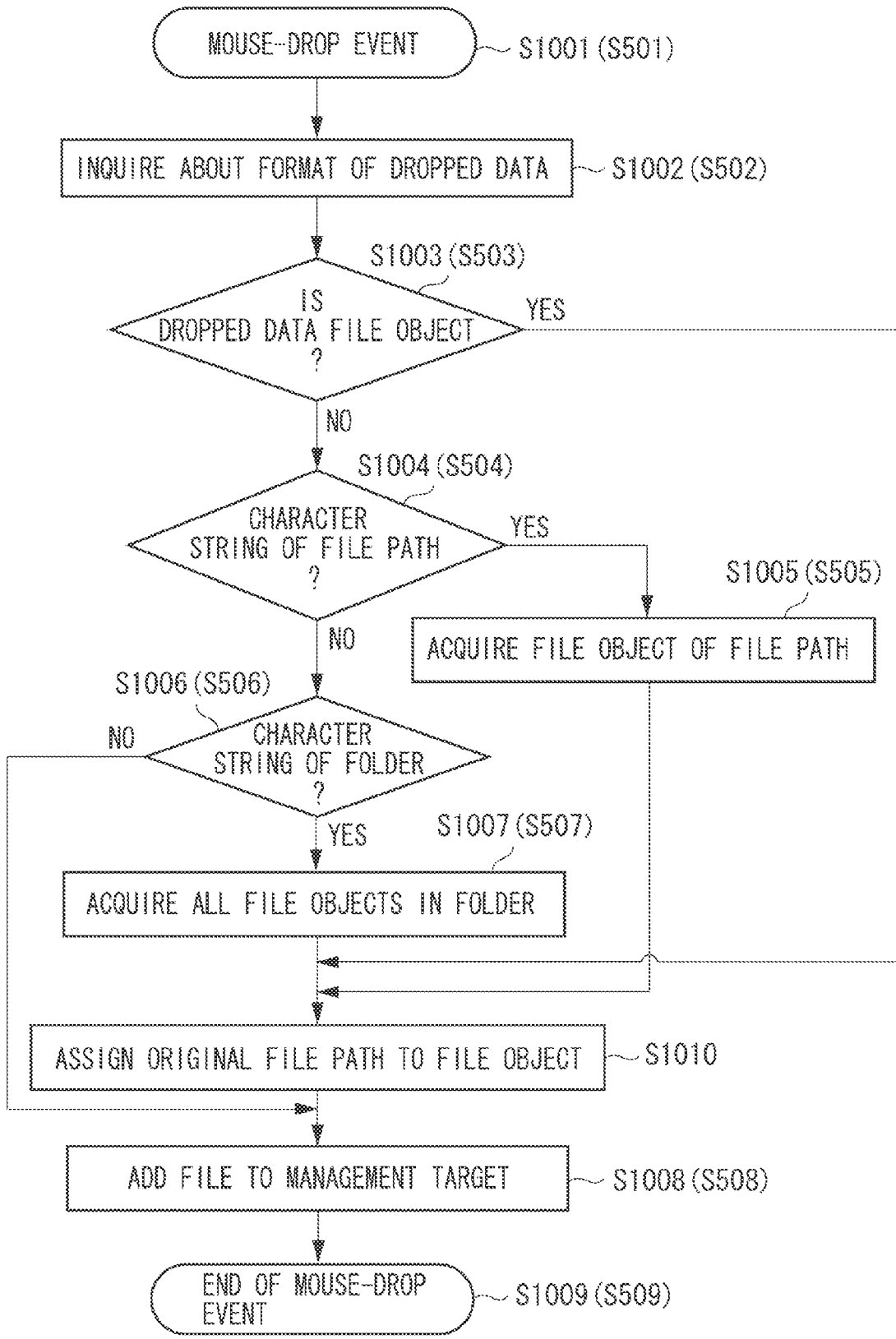
FIG. 10 is a flowchart illustrating processing of the file management application and the operating system.

FIG. 10 is a flowchart illustrating processing of the file management application and the operating system according to the present exemplary embodiment.

Regarding the processing flow in FIG. 10, descriptions of the processing in steps similar to steps S501 to S509 in FIG. 5 according to the first exemplary embodiment (which are indicated by the step number in parentheses) are not repeated.

In step S1010, the file management application B303 stores the original file path of the file which has undergone the drag and drop operation to the file object. The original file path is the file path of the file when the file is dragged.

In step S1008, the file management application B303 adds the file to the files managed by the file management application B303. The file path stored in step S1010 is reflected to property information of the file added in step S1008. The user can obtain the information by clicking the right mouse button.

Figure 11:
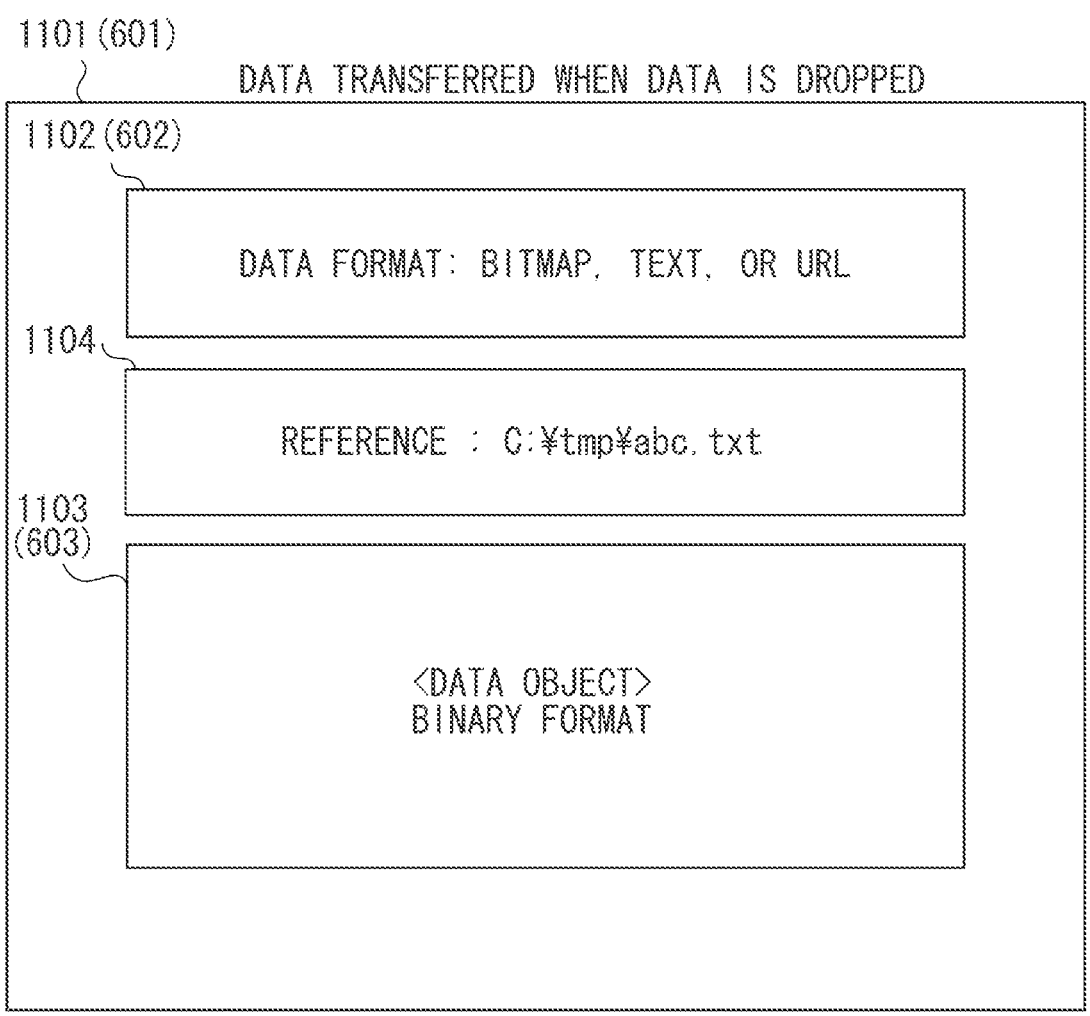
FIG. 11 illustrates an example of a data structure which is generated when the drag and drop operation is performed.

FIG. 11 illustrates an example of a data structure which is generated when the drag and drop operation is performed.

The data structure in FIG. 11 is similar to the data structure 601 in FIG. 6 except that a portion where information of a reference source 1104 is stored is added. Descriptions of the portions similar to the data structure 601, the data format 602, and the data object 603 in FIG. 6 of the first exemplary embodiment are not repeated.

A file path referenced by the dropped data is stored in the reference source 1104. The file path stored in the reference source 1104 is the file path of the file dragged from the file management application A301. By storing the reference source 1104 in the file managed by the file management application B303, the user can know the original location of the added file.

According to the present exemplary embodiment, in addition to the effects obtained from the first and the second exemplary embodiments, since the original file path of the file which is added to the file management application B303 is stored, the user is able to know the location of the original file at arbitrary timing. According to the present invention, a file can be easily added or moved to the file management application.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-093992 filed Apr. 20, 2011, which is hereby incorporated by reference herein in its entirety.

What is claimed is:

1. An information processing apparatus comprising a processor and a memory which stores a file management application program, wherein the processor executes the file management program to function as:
   an inquiry unit configured to inquire, if data dragged from a mail application is dropped to the file management application program, of an operating system whether the dragged data is a file object, a text character string indicating a file path or a text character string indicating a folder;
   an addition unit configured to add, if the dragged data is a file object as a result of the inquiry made by the inquiry unit, the dragged file object to the file management application program;
   a file object acquisition unit configured to acquire, if the dragged data is a text character string indicating a file path as a result of the inquiry made by the inquiry unit, a file object corresponding to the file path indicated by the dragged text character string, wherein the addition unit adds the file object acquired by the file object acquisition unit to the file management application program if the dragged data is the text character string indicating the file path; and
   an intra-folder file object acquisition unit configured to acquire, if the dragged data is a text character string indicating a folder as a result of the inquiry made by the inquiry unit, all file objects included in the folder indicated by the dragged text character string, wherein the addition unit adds the all file objects acquired by the intra-folder file object acquisition unit to the file management application program if the dragged data is the text character string indicating the folder.

2. The information processing apparatus according to claim 1, wherein if a file size of the file object acquired by the file object acquisition unit or the intra-folder file object acquisition unit exceeds a setting value, the addition unit generates a shortcut of the file object and adds the shortcut to the file management application program, and if the file size does not exceed the setting value, the addition unit adds the file object acquired by the file object acquisition unit or the intra-folder file object acquisition unit to the file management application program.

3. The information processing apparatus according to claim 1, wherein when the file object acquired by the file object acquisition unit or the file object acquired by the intra-folder file object acquisition unit is added to the file management application program, the addition unit further adds tracking information indicating where the file object were stored within the mail application.

4. A method for information processing, the method comprising:
   inquiring, if data dragged from a mail application is dropped to a file management application program, of an operating system whether the dragged data is a file object, a text character string indicating a file path or a text character string indicating a folder;
   adding, by an addition unit, if the dragged data is a file object as a result of the inquiry made by the inquiring step, the dragged file object to the file management application program;
   acquiring, by a file object acquisition unit, if the dragged data is a text character string indicating a file path as a result of the inquiry made by the inquiring step, a file object corresponding to the file path indicated by the dragged text character string, wherein the addition unit adds the file object acquired by the file object acquisition unit to the file management application program if the dragged data is the text character string indicating the file path; and
   acquiring, by an intra-folder file object acquisition unit, if the dragged data is a text character string indicating a folder as a result of the inquiry made by the inquiring step, all file objects included in the folder indicated by the dragged text character string, wherein the adding step adds the all file objects acquired by the intra-folder file object acquisition unit to the file management application program if the dragged data is the text character string indicating the folder.

5. The method according to claim 4, further comprising if a file size of an acquired file object exceeds a setting value, generating a shortcut of the file object and adding the shortcut to the file management application program, and if the file size does not exceed the setting value, adding the file object acquired by the file object acquisition unit or the intra-folder file object acquisition unit to the file management application program.

6. The method according to claim 4, wherein when the acquired file object of the file path or the acquired file object in the folder is added to the file management application program, further adding tracking information indicating where the file object were stored within the mail application.

7. A non-transitory computer-readable storage medium storing a file management application program, wherein the file management application program causes a computer to perform an information processing method, the information processing method comprising:
   inquiring, if data dragged from a mail application is dropped to a file management application program, of an operating system whether the dragged data is a file object, a text character string indicating a file path or a text character string indicating a folder;
   adding, by an addition unit, if the dragged data is a file object as a result of the inquiry made by the inquiring step, the dragged file object to the file management application program;
   acquiring, by a file object acquisition unit, if the dragged data is a text character string indicating a file path as a result of the inquiry made by the inquiring step, a file object corresponding to the file path indicated by the dragged text character string, wherein the addition unit adds the file object acquired by the file object acquisition unit to the file management application program if the dragged data is the text character string indicating the file path; and
   acquiring, by an intra-folder file object acquisition unit, if the dragged data is a text character string indicating a folder as a result of the inquiry made by the inquiring step, all file objects included in the folder indicated by the dragged text character string, wherein the adding step adds the all file objects acquired by the intra-folder file object acquisition unit to the file management application program if the dragged data is the text character string indicating the folder.

8. The non-transitory computer-readable storage medium according to claim 7, further comprising if a file size of an acquired file object exceeds a setting value, generating a shortcut of the file object and adding the shortcut to the file management application program, and if the file size does not exceed the setting value, adding the file object acquired by the file object acquisition unit or the intra-folder file object acquisition unit to the file management application program.

9. The non-transitory computer-readable storage medium according to claim 7, wherein when the acquired file object of the file path or the acquired file object in the folder is added to the file management application, further adding tracking information indicating where the file object were stored within the mail application.

* * * * *